No. 616,166. Patented Dec. 20, 1898.
J. J. USSERY.
HARROW.
(Application filed Nov. 20, 1897.)
(No Model.)
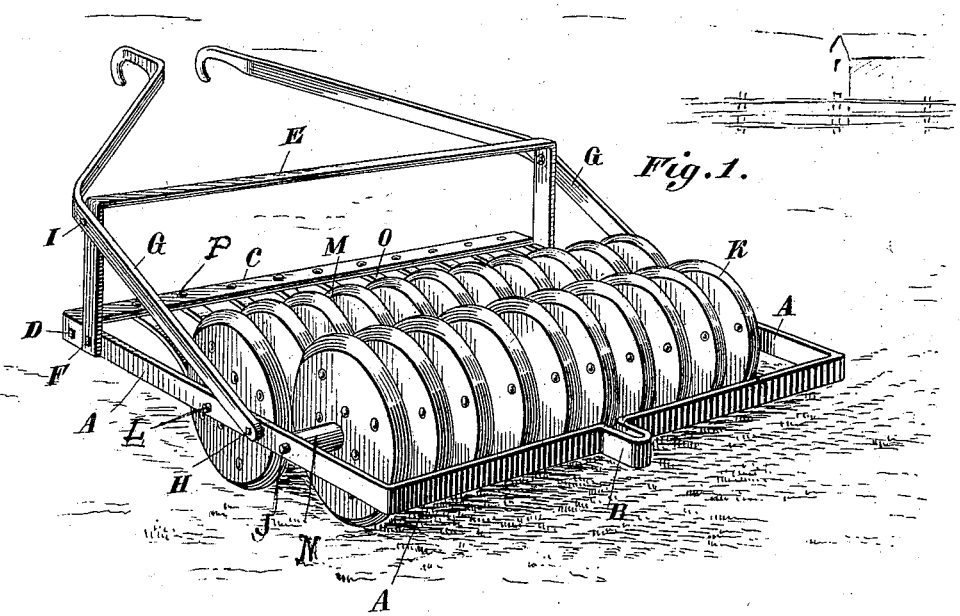
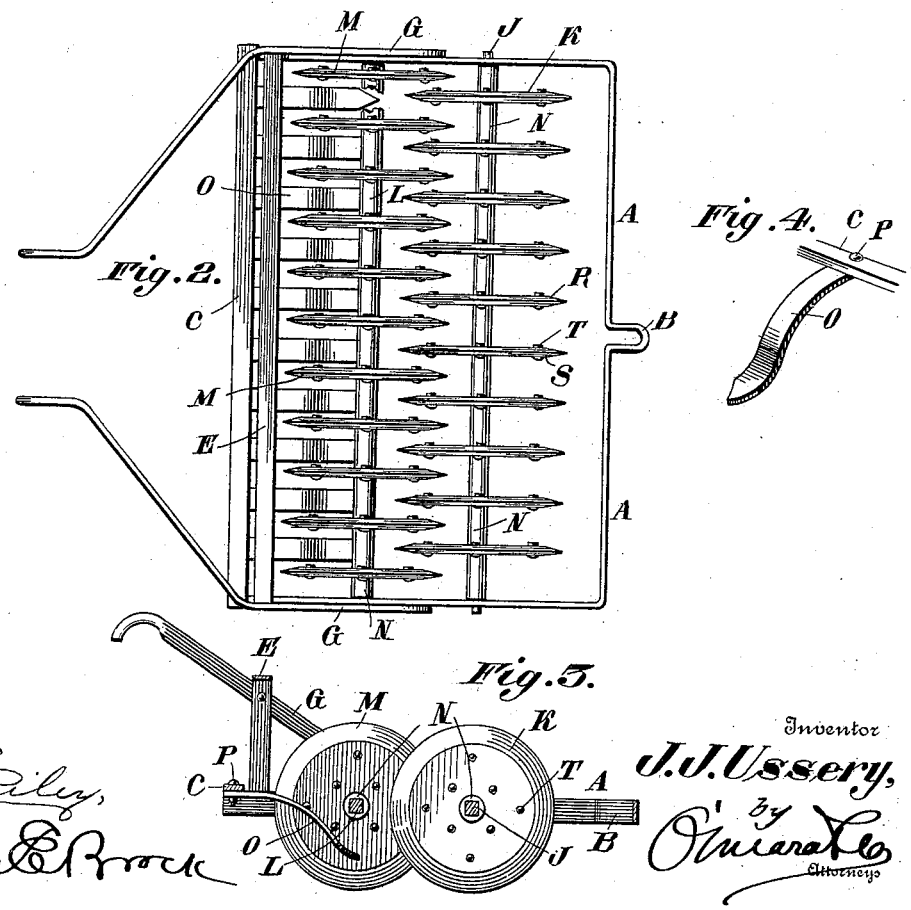
Witnesses
Inventor
J. J. Ussery,

United States Patent Office.

JOHN JAMES USSERY, OF EUROPA, MISSISSIPPI.

HARROW.

SPECIFICATION forming part of Letters Patent No. 616,166, dated December 20, 1898.

Application filed November 20, 1897. Serial No. 659,305. (No model.)

*To all whom it may concern:*

Be it known that I, JOHN JAMES USSERY, a citizen of the United States, residing at Europa, in the county of Webster and State of Mississippi, have invented a new and useful Harrow, of which the following is a specification.

My invention relates to harrows, and more especially to that class known as "disk harrows," in which the earth is pulverized or broken up by means of disks mounted upon horizontal shafts.

The object of my invention is to provide a simple, cheap, durable, and effective harrow of this class.

My invention consists in the improved construction, arrangement, and combination of details hereinafter fully described, and afterward specifically pointed out in the appended claim.

In order to enable others skilled in the art to which my invention most nearly appertains to make and use the same, I will now proceed to describe its construction and operation, reference being had to the accompanying drawings, forming part of this specification, in which—

Figure 1 is a perspective view of a harrow constructed in accordance with my invention in position for practical operation. Fig. 2 is a top plan view of the same. Fig. 3 is a vertical section on a plane cutting through the harrow from front to rear. Fig. 4 is a detail perspective view illustrating one of the stripper-teeth and the portion of the bar of the frame to which it is attached.

Like letters of reference mark the same parts wherever they occur in the various figures of the drawings.

Referring to the drawings by letters, A is the main frame of the harrow, which consists of a flat metal bar bent in rectangular form and extending along both sides and the front, being provided in the center of the front with a bend or loop B, to which the thills or tongue may be attached. The bar of which this main frame is composed is set edgewise and its rear ends are connected by a bar C, set flatwise, the connection being made by suitable bolts D.

E indicates a rectangular loop-shaped bar connected at the lower ends of its vertical arms by bolts F to the sides of the main frame near the rear thereof.

G G indicate bars of which the handles are formed, they being inclined rearwardly and upwardly from the point of attachment to the side bars of the frame by means of the bolts H to and beyond the loop E, being bent inwardly in the rear of said loop to bring the handles a proper distance apart and being secured to the uprights of the loop E by means of bolts I.

Mounted in the side bars of the frame is a shaft J, on which is secured a series of disks K, and in the rear of the shaft J, also mounted in the side bars of the frame, is a shaft L, parallel with the shaft J and provided likewise with a series of disks M. The disks on each shaft are held at a proper distance from the frame and from each other by sleeves N, and the disks K on the shaft J are arranged to alternate with the disks M on the shaft L, the distance of the shafts apart and the size of the disks being so regulated that the two series will overlap each other, as clearly shown.

O indicates a series of curved metallic arms secured at their rear ends by bolts P to the cross-bar C and projecting downwardly and forwardly between the disks M on the shaft L.

Each of the disks consists of two plates of metal R and S, having their outer edges beveled on the outside and secured together by bolts T.

The operation of my invention may be described as follows: The harrow being drawn by a suitable team, the disks will cut into the soil, and thus minutely pulverize the same. Any soil which may be lumpy or in clods and may lodge between the disks K on the shaft J will be stripped therefrom and prevented from being carried round by means of the disks M, and any of the same character of soil which may become lodged between the disks M will be stripped therefrom by the teeth or strippers O.

From the foregoing description it will be obvious that I have provided a disk harrow and frame of very simple, strong, and durable construction, and I have also provided it with means whereby clods and lumps of earth are prevented from being carried around by the disks, and thus disturbing the regularity and evenness of the work of the harrow.

While I have illustrated and described what I consider efficient means for carrying out my invention, I do not wish to be understood as restricting myself to the exact details of construction shown and described, but hold that any slight changes and variations, such as might suggest themselves to the ordinary mechanic, would properly fall within the limit and scope of my invention.

Having thus fully described my invention, what I claim as new, and desire to secure by Letters Patent of the United States, is—

The herein-described harrow comprising the main frame composed of the front and sides made of a single piece of flat bar having bend B in the center of the front, and the rear bar C set flatwise and connecting the rear ends of the side bars, the angular loop consisting of cross-bar E supported at the top of uprights secured to the side bars near their rear ends, the handle-bars G secured to the side bars at E and to the uprights at I, being inclined upward and backward from H to I and thence inward and upward, and finally formed into parallel handles, in combination with the shafts journaled in the side bars, the alternating, overlapping disks on said bars, and the downwardly and forwardly inclined stripper-bars secured to the rear cross-bar and projecting between the disks on the rear shafts, substantially as described.

JOHN JAMES USSERY.

Witnesses:
J. S. FULTON,
T. R. CRICK.